Jan. 12, 1971  J. J. MacKINNEY ET AL  3,554,875
METHOD OF FABRICATING A MANDREL FOR ELECTROFORMING
Filed Aug. 1, 1968  2 Sheets-Sheet 1

INVENTORS
JOHN J. MAC KINNEY
MICHAEL MATTIA
BY
Edward M. Farrell
ATTORNEY

Jan. 12, 1971   J. J. MacKINNEY ET AL   3,554,875
METHOD OF FABRICATING A MANDREL FOR ELECTROFORMING
Filed Aug. 1, 1968   2 Sheets-Sheet 2

INVENTORS
JOHN J. MAC KINNEY
BY  MICHAEL MATTIA

Edward M. Farrell

ATTORNEY

United States Patent Office 3,554,875
Patented Jan. 12, 1971

3,554,875
METHOD OF FABRICATING A MANDREL FOR ELECTROFORMING
John J. MacKinney, Narberth, and Michael Mattia, Upper Darby, Pa., assignors to The Budd Company, Philadelphia, Pa., a corporation of Pennsylvania
Filed Aug. 1, 1968, Ser. No. 749,464
Int. Cl. B51c 3/08; C23b 7/02
U.S. Cl. 204—9   3 Claims

ABSTRACT OF THE DISCLOSURE

A method of electroforming an article corresponding in shape to a cavity and smaller in dimension than the cavity is provided. A mold is first cast having an opening therein corresponding to the cavity. A liner is inserted into the mold with a mandrel being then formed in the mold with the liner in place. After the mandrel is removed from the mold, the article is formed on the mandrel by an electrodeposition process.

---

Figure 1:
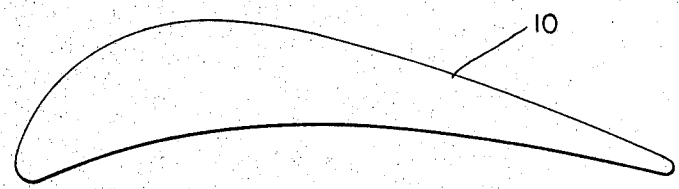

In many cases, it is necessary to form an article for insertion into an irregular shaped cavity. In many such cases, it is necessary that the article be spaced from the walls forming the cavity by some predetermined distance after it is inserted.

One such use of the article mentioned, for example, may involve a cooling system wherein an insert for a body having a cavity to be cooled is provided. In this case, a coolant is injected into the insert and into the space between the insert and the inner walls of the body. Because of the spacing between the inserted articles and the walls of the body, a controlled circulation of the cooling fluid is possible.

In the past, various mechanical means have been employed to make the inserts for a cavity. In the main, these means have involved mechanical forming of the part to be inserted and have resulted in the rejection of many of the parts because of the difficulty of maintaining the relatively close tolerances required.

It is well known that electroplating is a process for forming irregular shaped objects. Generally, a mandrel having a shape of the article to be formed is immersed in an electrolytic bath and becomes the cathode in the electrolytic system. Also, immersed in the bath is an anode composed of the plating metal. A voltage is applied between the anode and the cathode causing a current to pass through the electrolytic solution, which electrolizes and plates the cathode with the anode material to the desired thickness. In this way articles may be formed with silver, copper, iron, cadmium, nickel, and a wide variety of other metals.

The use of electrodeposition to form articles, while relatively expensive for mass production, has special application when articles of irregular shapes are to be formed and mass production is not the factor.

It is an object of this invention to provide a novel method for making an element to be inserted into a cavity.

It is a further object of this invention to provide an improved method for making an element for insertion into a larger cavity wherein the inserted article is of substantially the same shape as the larger cavity.

It is still a further object of this invention to provide an improved method for making an element for insertion into a larger cavity wherein the element inserted is of substantially the same shape as the larger cavity and wherein the spacing between the inserted element and the walls of the cavity is precisely controlled.

In accordance with the present invention, a method of electroforming an article corresponding in shape to a cavity and being of smaller dimensions than the cavity is provided. A casting is first made having an opening corresponding to the cavity. A liner is then inserted into the casting with the thickness of the liner being determined by the difference in size between the outer wall of the article to be inserted and the inner walls of the cavity. A mandrel is then formed in the mold with the liner in place. After the mandrel is removed, a plating of metal is electrodeposited thereon. Projecting segments are also deposited on the mandrel so that when the article is inserted into the cavity, a space is provided between the outer wall of the article and the inner wall of the cavity.

Other objects and advantages of the present invention will be apparent and suggest themselves to those skilled in the art from a reading of the following specifications and claims, in conjunction with the accompanying drawings, in which FIGS. 1 to 10 illustrate various steps involved in the method of the present invention.

In describing the present invention, it will be assumed that the article to be formed is to be inserted into a cavity which is normally difficult to examine. The article may involve a certain depth, may be relatively thin or any of a number of irregular shapes. Only the essential steps will be described, it being understood that many minor steps well known to those skilled in the field will be omitted.

FIG. 1 illustrates a model 10 which is cast from the cavity or other cavity into which an article is to be inserted. This model is a top view and may extend relatively long. The model may be made from a RTV silicone rubber. This rubber may be inserted into the cavity in a liquid form and permitted to solidify in the shape of the cavity. The resulting article is relatively soft and compressible so that it may be taken out of the cavity easily and is capable of retaining the shape of a cavity after it has been removed.

Figure 2:
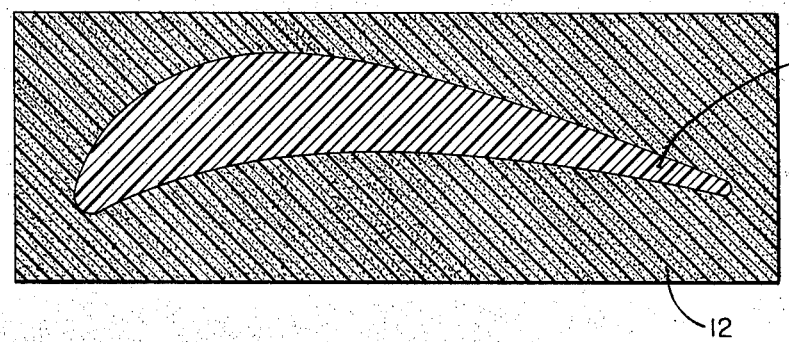

Referring particularly to FIG. 2, after the model 10 has been removed, a breakaway plaster cast 12 is formed around the model 10. The model 10 is then taken out of the plaster cast 12 and a rigid epoxy model 14 is then formed within the plaster cast 12. The epoxy model may be formed by pouring the epoxy in a liquid form into the opening within the plaster cast and then permitting it to harden. The plaster cast is then broken away leaving the solid epoxy model 14.

Figure 3:
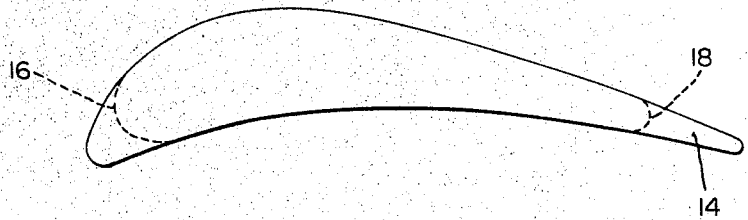

Referring particularly to FIG. 3, after the epoxy model 14 has been formed, a slight correction at the leading and trailing edges may be made by machining away portions of the model 14 as illustrated by dotted lines 14 and 16. These corrections may be necessary or not necessary depending upon the particular application.

Figure 4:

Referring particularly to FIG. 4, the epoxy model 14 is illustrated after the leading and trailing edges have been trimmed. The model 14 illustrated in FIG. 4 represents the master model for the vane insert, as will be described.

Figure 5:
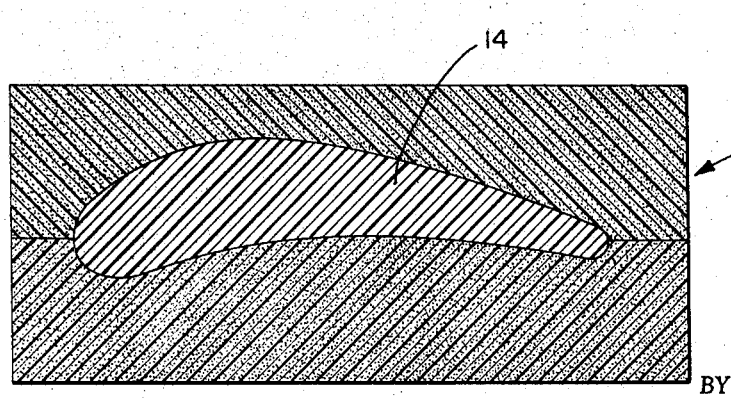

Referring particularly to FIG. 5, a two piece gypsum cement split mold 20 is cast from the master model 14. The model 14 is then taken out of the mold 20.

The subsequent steps involve the making of a liner to be inserted into the split mold 20 so that the ultimate article to be inserted into the cavity may be formed.

Figure 6:
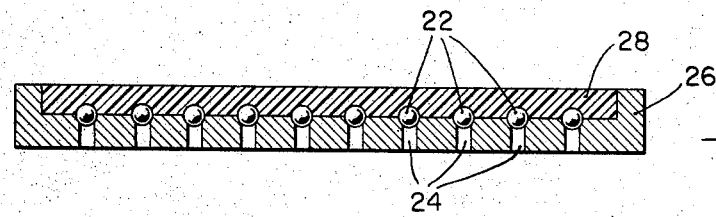

Referring particularly to FIG. 6, a plurality of steel balls 22 are first pressed into holes 24 which are drilled through an aluminum plate 26. A plastisol liner 28 is formed by pouring the plastisol in a liquid form into the aluminum plate 26 and permitting the plastisol to harden. The plastisol assumes the shape of the aluminum plate and the steel balls in effect cause indentations to be formed in the liner 28.

Figure 7:
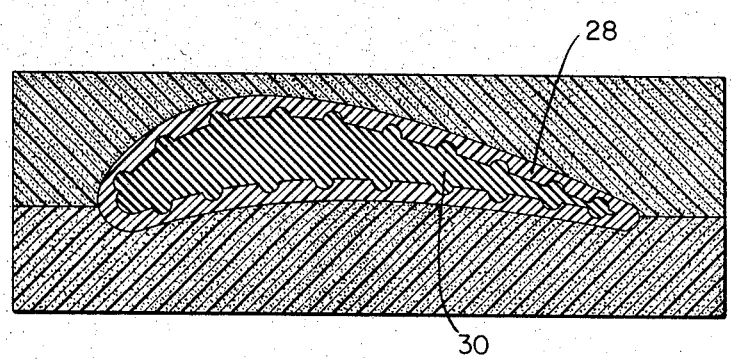

Referring particularly to FIG. 7, after the liner 28 has been formed in the manner illustrated, the inner walls of the split mold 20 are lined with the plastisol liner. The plastisol liner may be held in shape by any suitable adhesive. The liner may require some trimming so as to fit the inner walls of the split mold 20.

Still referring to FIG. 7, after the liner 28 has been suitably secured to the inner walls of the split mold 20, a silicone rubber mandrel 30 is cast into the lined split mold. This rubber may be inserted in a liquid form and then permitted to solidify. The rubber is sufficiently pliable to permit it to be easily withdrawn from the split mold. The rubber mandrel 30 is then removed from the split mold 20.

After the rubber mandrel 30 has been removed from the split mold 20, it may be sprayed with reduced silver and then electroformed with a nickel plating 32 in a standard nickel sulfamate solution.

Figure 8:
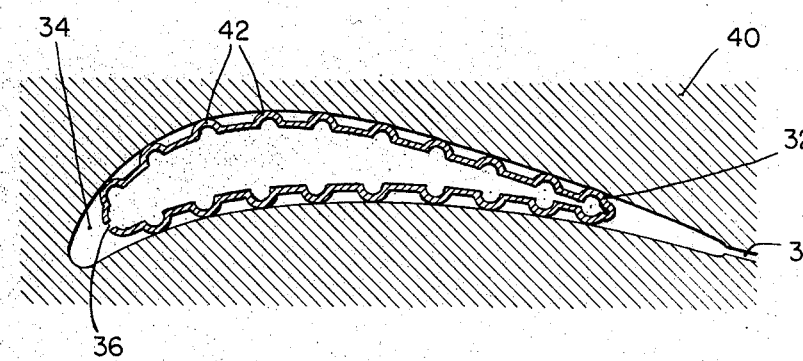

Referring particularly to FIG. 8, the electroformed article 32 is inserted within the cavity 34 after the rubber mandrel has been removed. This may be the cavity in a body, which it is desired to cool. In some cases, it may be desirable to have a metal insert within the rubber mandrel to permit easy removal. For example, the metal insert may include threaded openings adapted to receive threaded rods to permit threading and easy manual removal of the metal insert.

In one embodiment of the invention an opening 36 may be formed in the article 32. A conduit 38 may be formed in the body 40, which includes the cavity.

A coolant fluid may be inserted into the article 32 and be forced under pressure through the opening 36 and flow in the space provided to cool the inner walls of the body 40. The fluid is forced out of the body 40 through the opening 38.

It is seen that the sections 42 projecting from the main article 32 provide the necessary spacing between the outer wall of the article 32 and the inner wall of the body 40. Because of the manner of making these projections, as previously described, a precise spacing is provided. Consequently an even degree of cooling is obtained.

While a cooling system has been described generally, it is apparent that the present invention is directed toward making an article to be inserted into an irregular shaped cavity with the article being smaller in dimension than the cavity. Also, means are provided for assuring that the dimensions between the inner and outer article are precise.

Figure 9:
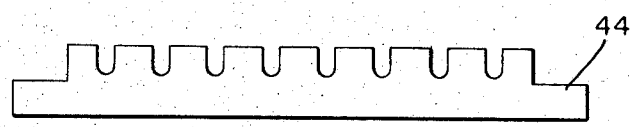

It is apparent that the pattern formed on the liner in the aluminum mold 26 may be varied by changing the spacing of the holes or the size of the steel balls used. Other patterns other than that illustrateed may of course be produced. Another such pattern which may be produced is illustrated in FIG. 9 where a liner 44 is illustrated.

While in most cases the silicone rubber previously discussed is sufficiently pliable to permit it to be removed easily from a cavity, it may sometimes be necessary to maintain the shape of a mandrel 30 during electroplating and then permit collapsing of the mandrel for ease of removal after electroplating. In this case, a core element 46 may be used as illustrated in FIG. 10.

Figure 10:
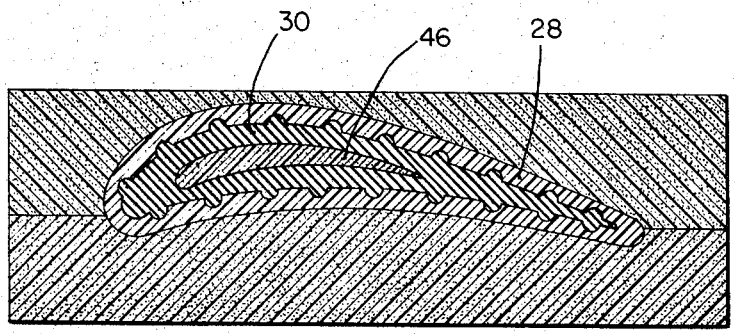

FIG. 10 is substantially the same as FIG. 7 except for the insertion of the core element 46. The core element 46 may be made of any rigid material. However, it is preferable to use a low melting material such as hard wax or metal alloys. This will permit melting of the core element and prevent stressing and possible damage to the mandrel 30 during the removal.

While specific materials such as epoxy plastisol, wax etc. have been mentioned in describing the subject invention, it is apparent that other materials having similar properties may be employed without departing from the scope of the invention, which is directed towards methods and electroformed articles rather than towards particular materials.

The present invention has thus provided a relatively simple means for providing an article of irregular shape for insertion into a larger cavity. The side of the inserted article may be varied in accordance with the spacing desired between the inserted article and the exterior article.

What is claimed is:

1. A method of electroforming an article with spacer sections thereon corresponding in shape to a cavity and being of smaller dimensions than said cavity comprising the steps of forming a pliable model from said cavity, forming a break-away casting around said pliable model, removing said pliable model from said break-away casting, forming an epoxy model within said break-away casting, breaking away said casting, forming a mold around said epoxy model, removing said epoxy model from said mold to form an opening in said mold corresponding in size and shape of said cavity, producing a plurality of indentations in a liner, inserting said liner in the opening of said mold, forming a mandrel with spacing sections thereon in said mold with said liner disposed therein, removing said mandrel from said mold, and electrodepositing metal on said mandrel to form said article.

2. The invention as set forth in claim 1 wherein said mold with said opening comprises a two piece mold and the additional steps are provided for inserting a relatively solid element in said mandrel during the formation of said article and removing said element after the formation of said article to permit easy removal of said mandrel from said article after it is formed.

3. A method of electroforming an article corresponding in shape to a cavity and being of smaller dimensions than said cavity comprising the steps of casting a main mold having an opening corresponding in size to said cavity, providing a liner mold having spaced openings therein, inserting elements partly within said openings, forming a liner by pouring a liquid plastic material in said liner mold and over said elements, permitting said plastic material to solidify whereby indentations are formed in said liner, removing said liner from said liner mold, inserting said liner in said main mold, forming a mandrel with spacing sections thereon in said main mold with the liner with said indentations being disposed therein, removing said mandrel from said mold, and electrodepositing metal on said mandrel to form said article.

References Cited

UNITED STATES PATENTS

| | | | |
|---|---|---|---|
| 2,004,102 | 6/1935 | Dickey | 204—9 |
| 2,282,022 | 5/1942 | Bishop et al. | 204—9 |
| 2,327,762 | 8/1943 | Bull | 204—4 |
| 3,476,657 | 11/1969 | Lundquist | 204—9 |

JOHN H. MACK, Primary Examiner

T. TUFARIELLO, Assistant Examiner

U.S. Cl. X.R.

204—6